J. R. McGIFFERT.
LOCOMOTIVE FOR LOGGING AND THE LIKE.
APPLICATION FILED MAY 4, 1908.
923,564.
Patented June 1, 1909.
2 SHEETS—SHEET 2.
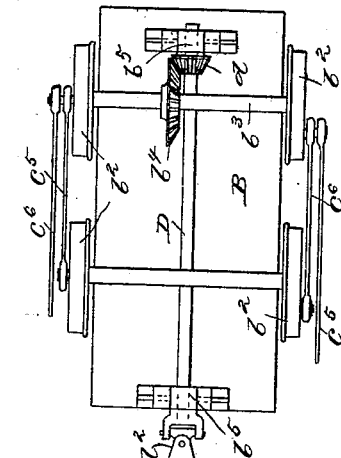
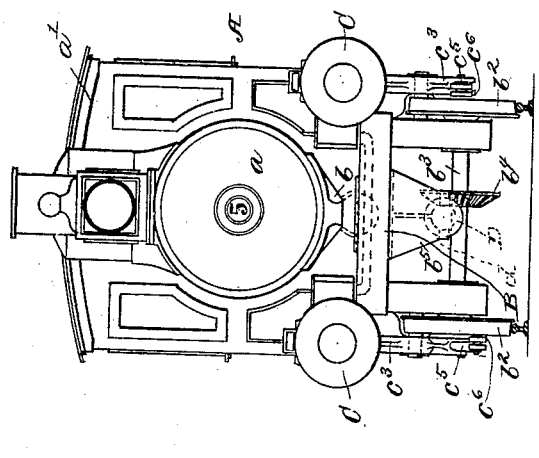
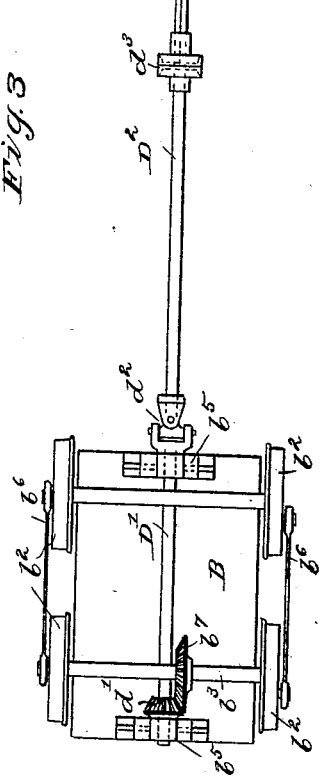
Witnesses:
E. R. Rodd.
Jno. F. Oberlin
Inventor:
John R. McGiffert
by J. B. Fay
Attorney.

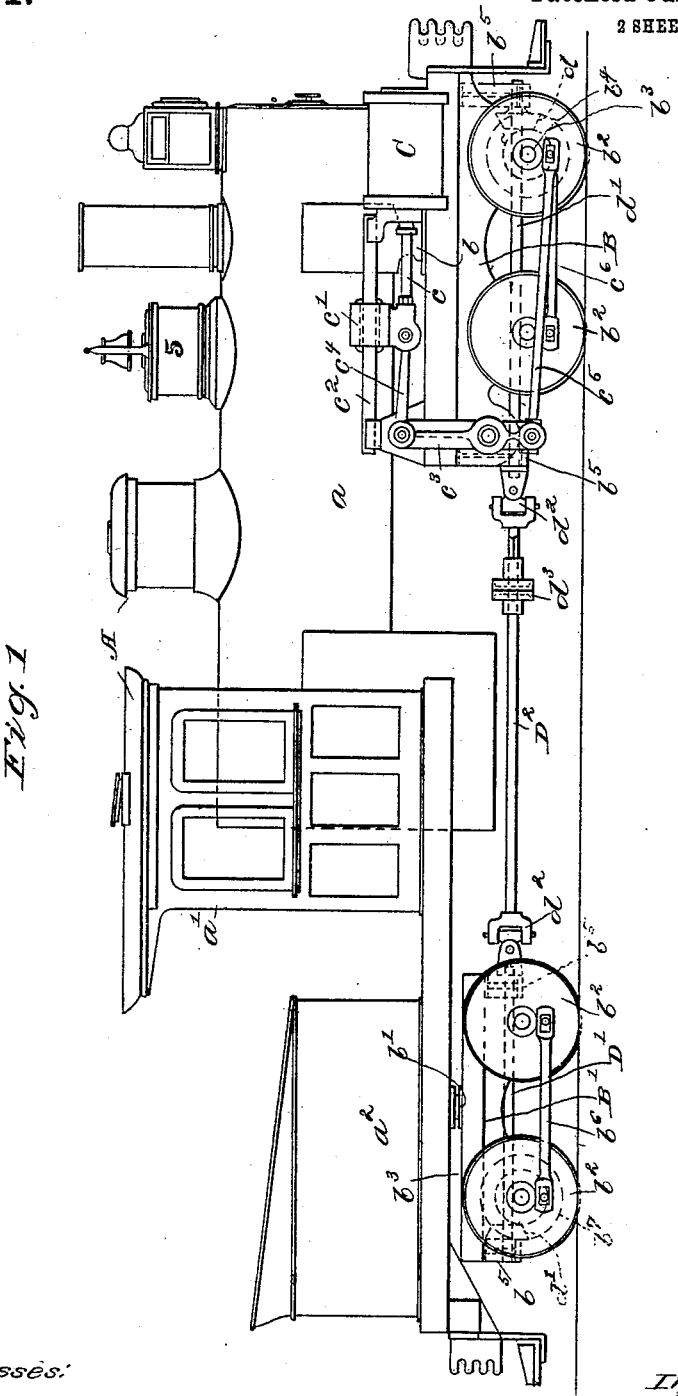

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MINNESOTA.

LOCOMOTIVE FOR LOGGING AND THE LIKE.

No. 923,564.     Specification of Letters Patent.     Patented June 1, 1909.

Application filed May 4, 1908. Serial No. 430,662.

*To all whom it may concern:*

Be it known that I, JOHN R. McGIFFERT, citizen of the United States, resident of Duluth, county of St. Louis, and State of Minnesota, have invented a new and useful Improvement in Locomotives for Logging and the Like, of which the following is a specification, the principle of the invention being herein explained and the best mode in which I have contemplated applying that principle, so as to distinguish it from other inventions.

My present invention relates to locomotives, and particularly to locomotives designed for use on rough and uneven road beds, such as are encountered in logging and similar operations. Railroads laid for use in such connection are constructed of comparatively light rail and heavy grades and sharp curves are apt to be of frequent occurrence, since the expense involved in their elimination would be unwarranted. These conditions impose, it will be obvious, peculiar requirements upon a locomotive designed for use on such track, chief among which are high traction power and flexibility with comparatively light load on any of the wheels. No great speed is required or desirable.

It is with the object of providing a locomotive that will satisfactorily fulfil these and related requirements that the present locomotive has been designed, and to the accomplishment of this object said invention consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings: Figure 1 is a side elevation of a locomotive embodying my invention; Fig. 2 is a front elevation of the same; and Fig. 3 represents a bottom plan view of the trucks upon which such engine is mounted together with the connections between the same.

Referring to the figures of the drawings, A will be seen to designate the body of a tank locomotive in which the boiler $a$, cab $a'$, and tank $a^2$, are rigidly joined together so as in effect to be an integral, or solid, structure. Such locomotive body is pivotally supported at its respective ends upon two trucks B B', the connection with the forward truck being had by means of a ball and socket joint $b$ through which the steam and exhaust pipes pass to and from the cylinders C. The rear truck B' is connected to the body by center plates $b'$. In order to simplify and render clearer the drawings, the spring side bearings, which will of course be provided to steady the body on the trucks and to prevent undue tipping of the same, are omitted.

The cylinders C, two in number, to which reference has just been made, are both mounted on the forward truck, being located, one on each side of the boiler, above and in substantial alinement with the corresponding wheels $b^2$ $b^2$ of such truck. The piston rod $c$ is connected with a cross-head $c'$ sliding on a guide $c^2$ similarly disposed on such truck. The motion of this cross-head is in turn communicated to the wheels $b^2$ $b^2$ through connections that include a vertically disposed lever $c^3$, having its upper end connected with such cross-head by a link, or connecting rod $c^4$, and its lower end with the forward wheel $b^2$ by means of a connecting rod $c^5$. Links or side bars $c^6$ connect such forward wheel with the rear wheel of the truck.

As is illustrated, the upper arm of lever $c^3$ is preferably made longer than the lower arm, (being shown twice as long), whereby the tractive power of the engine is doubled and at the same time the use of a much larger cylinder permitted than could otherwise be directly connected to the forward driving wheels owing to the relatively small diameter of the latter. Thus the cylinders shown on the drawings have a stroke nearly equal to the full diameter of the wheel, which is, obviously, twice as long a stroke as could be used, were the cross-head connected directly to the cranks by the use of an ordinary connecting rod.

On the axle $b^3$ of the forward pair of wheels of front truck B is fixedly mounted a beveled gear $b^4$ that meshes with a bevel pinion $d$ on the end of a longitudinally disposed shaft D supported in suitable bearings $b^5$ in the truck frame. This shaft, together with another similar shaft D' mounted in corresponding bearings $b^5$ in the rear truck B', constitutes part of a flexible shaft whereby driving connection is had between such two trucks. The longitudinal shaft D' in the rear truck is connected to drive the wheels $b^2$ thereof through a bevel pinion $d'$ and gear $b^7$ mounted on such shaft and the rearmost axle, respectively, just as in the case of the front truck B, motion being communicated from the rear pair of wheels to the front pair by side bars $b^6$, as will be readily understood. The intermediate portion of such flexible shaft, the extremities of which are thus seen to consist of shafts D D', comprises an extensible connecting rod, or shaft, $D^2$ that is attached to the inner ends of the respective truck shafts by universal joints $d^2$, thus affording, as will be obvious, the required freedom of movement to the respective trucks as the locomotive passes over uneven trackways and around sharp curves without interfering with the connection aforesaid. The requisite extensibility of shaft $D^2$ is furnished by a sleeve coupling $d^3$ therein.

The operation of my improved locomotive should be fairly obvious from the preceding description of its construction. It may be well to point out, however, that by having the power means (specifically the cylinder and reciprocating cross-head operated thereby) connected to drive the front truck only, and communicating motion to the wheels of the rear truck through such front truck, I secure a very considerable advantage over the prevailing arrangement wherein the power means are connected to rotate a shaft operating to drive both trucks equally. For by my arrangement power is transmitted to the rear truck only when the exigency of the occasion requires it, or in other words, only when the adhesion of the wheels of the forward truck is insufficient to haul the load. The connection between the power means and the front truck being direct and without the intervention of gearing, it will be obvious, that no gearing is ordinarily in use at all. This is in marked distinction from the construction previously alluded to, in which the drive must always be had through the two sets of beveled gears connecting the longitudinal shaft with the respective trucks, with the increase in wear and decrease in efficiency arising from the rapidity with which such gears cut out, the loss of power due to friction, and the back-lash that results from the play between the teeth of the gears and pinions. By my arrangement, such back-lash of the gearing is practically eliminated, thereby reducing the wear and tear on such gears and prolonging the life of the same, since such gears will only be called into play when the wheels of the forward truck actually slip on the rail. Not only will the loss from wear be thus very much lessened but loss from friction will also be considerably reduced as the power developed in the cylinder can be transmitted through connecting brass-bushed rods $c^4$ $c^5$ and lever $c^3$ with much less loss from friction than through gearing. Not only will the wear be much less but repairs, in case they are necessary, can be much more easily and far less expensively made, since gearing is always an expensive item in the construction of a machine, as is well known.

A further advantage achieved by my construction is that the cylinders are elevated and the cranks lie close into the wheels so that there is a minimum breadth at the lower part of the engine and the danger of running into obstructions, always present in the operation of locomotives on railroads of the kind in view, greatly lessened.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a locomotive, the combination of a pivoted truck, power means directly connected to drive said truck, a second truck, and flexible driving connections from said first to said second truck, said connections including two shafts disposed longitudinally of and geared to said trucks, respectively, and an extensible shaft having its ends flexibly joined to the inner ends of said two shafts.

2. In a locomotive, the combination of a pivoted truck, power means directly connected to drive said truck, a second truck, and flexible driving connections from said first to said second truck, said connections including shafts disposed longitudinally of and geared to said trucks, respectively, an extensible shaft lying between aforesaid shafts, and universal joints connecting the adjacent ends of the latter with said extensible shaft.

3. In a locomotive, the combination of a pivoted truck, a cylinder and reciprocating cross-head carried by said truck, a second truck, and geared driving connections from said first to said second truck.

4. In a locomotive, the combination of a pivoted truck, a cylinder and reciprocating cross-head carried by said truck, a second truck, and flexible driving connections from said first to said second truck, said connections including a shaft and gears.

5. In a locomotive, the combination of a pivoted truck, a cylinder and reciprocating cross-head carried by said truck, a second truck, and driving connections from said first to said second truck, said connections including shafts disposed longitudinally of and geared to said trucks, respectively, and an extensible shaft having its ends flexibly joined to the inner ends of said two shafts.

6. In a locomotive, the combination of a pivoted truck, a cylinder and reciprocating cross-head carried by said truck, a second truck, and driving connections from said first to said second truck, said connections including shafts disposed longitudinally of and geared to said trucks respectively, an extensible shaft lying between aforesaid shafts, and universal joints connecting the adjacent ends of the latter with said extensible shaft.

7. In a locomotive, the combination of a truck, a cylinder and reciprocating cross-head, connections, including a lever, between said cross-head and the wheels of said truck, a second truck, and geared driving connections from said first to said second truck.

8. In a locomotive, the combination of a truck, a cylinder and reciprocating cross-head, connections, including a lever, between said cross-head and the wheels of said truck, a second truck, and flexible driving connections from said first to said second truck, said connections including shaft and gears.

9. In a locomotive, the combination of a truck, a cylinder and reciprocating cross-head, connections, including a lever, between said cross-head and the wheels of said truck, a second truck, and driving connections from said first to said second truck, said connections including shafts disposed longitudinally of and geared to said trucks, respectively, and an extensible shaft having its ends flexibly joined to the inner ends of said two shafts.

10. In a locomotive, the combination of a truck, a cylinder and reciprocating cross-head, connections, including a lever, between said cross-head and the wheels of said truck, a second truck, and driving connections from said first to said second truck, said connections including shafts disposed longitudinally of and geared to said trucks, respectively, an extensible shaft lying between aforesaid shafts, and universal joints connecting the adjacent ends of the latter with said extensible shaft.

11. In a locomotive, the combination of a pivoted truck, a cylinder and reciprocating cross-head, connections, including a lever, between said cross-head and the wheels of said truck, a second truck, and geared driving connections from said first to said second truck.

12. In a locomotive, the combination of a pivoted truck, a cylinder and reciprocating cross-head, connections, including a lever, between said cross-head and the wheels of said truck, a second truck, and flexible driving connections from said first to said second truck, said connections including a shaft and gears.

13. In a locomotive, the combination of a pivoted truck, a cylinder and reciprocating cross-head, connections, including a lever, between said cross-head and the wheels of said truck, a second truck, and driving connections from said first to said second truck, said connections including shafts disposed longitudinally of and geared to said trucks, respectively, and an extensible shaft having its ends flexibly joined to the inner ends of said two shafts.

14. In a locomotive, the combination of a pivoted truck, a cylinder and reciprocating cross-head, connections, including a lever, between said cross-head and the wheels of said truck, a second truck, and driving connections from said first to said second truck, said connections including shafts disposed longitudinally of and geared to said trucks, respectively, an extensible shaft lying between aforesaid shafts, and universal joints connecting the adjacent ends of the latter with said extensible shaft.

15. In a locomotive, the combination of a pivoted truck, cylinders and reciprocating cross-heads carried by said truck, said cylinders and cross-heads being mounted substantially above and in alinement with the wheels of said truck, connections, including a lever, between said cross-heads and wheels, a second truck, and geared driving connections from said first to said second truck.

16. In a locomotive, the combination of a pivoted truck, cylinders and reciprocating cross-heads carried by said truck, said cylinders and cross-heads being mounted substantially above and in alinement with the wheels of said truck, connections, including a lever, between said cross-heads and wheels, a second truck, and flexible driving connections from said first to said second truck, said connections including a shaft and gears.

17. In a locomotive, the combination of a pivoted truck, cylinders and reciprocating cross-heads carried by said truck, said cylinders and cross-heads being mounted substantially above and in alinement with the wheels of said truck, connections, including a lever, between said cross-heads and wheels, a second truck, and driving connections from said first to said second truck, said connections including shafts disposed longitudinally of and geared to said trucks, respectively, and an extensible shaft having its ends flexibly joined to the inner ends of said shafts.

18. In a locomotive, the combination of a pivoted truck, cylinders and reciprocating cross-heads carried by said truck, said cylinders and cross-heads being mounted substantially above and in alinement with the wheels of said truck, connections, including a lever, between said cross-heads and wheels, a second truck, and driving connections from said first to said second truck, said connections including shafts disposed longitudinally of and geared to said trucks, respectively, an extensible shaft lying between aforesaid shafts, and universal joints connecting the adjacent ends of the latter with said extensible shaft.

19. In a locomotive, the combination of two trucks pivotally supporting the respective ends of said locomotive, power means directly connected to drive one of said trucks, and flexible driving connections, including a shaft and gears between said directly driven truck and the other truck.

20. In a locomotive, the combination of two trucks pivotally supporting the respective ends of said locomotive, power means directly connected to drive one of said trucks, shafts disposed longitudinally of and geared to said trucks, respectively, and an extensible connecting shaft having its ends flexibly joined to the inner ends of said two shafts.

21. In a locomotive, the combination of two trucks pivotally supporting the respective ends of said locomotive, power means directly connected to drive one of said trucks, shafts disposed longitudinally of and geared to said trucks, respectively, an extensible connecting shaft lying between aforesaid shafts, and universal joints connecting the adjacent ends of the latter with said extensible shaft.

22. In a steam locomotive, the combination of two trucks pivotally supporting the respective ends of said locomotive, cylinders and reciprocating cross-heads carried by one of said trucks, said cylinder and cross-heads being mounted substantially above and in alinement with the wheels of said truck, and connections between said cross-heads and wheels, said connections including a vertically disposed lever, the other truck being connected to be driven from said first truck.

23. In a steam locomotive, the combination of two trucks pivotally supporting the respective ends of said locomotive, cylinders and reciprocating cross-heads carried by the forward truck, said cylinders and cross-heads being mounted on each side of said locomotive substantially above and in alinement with the wheels of the truck, connections between each of said cross-heads and corresponding wheels, said means including a lever, and flexible driving connections between said forward truck and the rear truck.

24. In a steam locomotive, the combination of two trucks pivotally supporting the respective ends of said locomotive, a cylinder and reciprocating cross-head mounted on each side of said locomotive substantially above and in alinement with the wheels of the forward truck, connections between said cross-heads and corresponding wheels, said means including a lever, shafts disposed longitudinally of and geared to said trucks, respectively, and an extensible connecting shaft having its ends flexibly joined to the inner ends of said two shafts.

Signed by me this 29th day of April, 1908.

JOHN R. McGIFFERT.

Attested by:
  J. J. LUMM,
  E. M. JEFFREY.